(12) United States Patent
Yamagishi

(10) Patent No.: US 7,142,089 B2
(45) Date of Patent: Nov. 28, 2006

(54) VEHICLE MANAGEMENT SYSTEM

(76) Inventor: Junichi Yamagishi, c/o Unirec Co., Ltd., 6-3, 2-Chome, Kaminarimon, Taito-ku, Tokyo (JP) 111-0034

( * ) Notice: Subject to any disclaimer, the term of this patent is extended or adjusted under 35 U.S.C. 154(b) by 0 days.

(21) Appl. No.: 10/095,403

(22) Filed: Mar. 11, 2002

(65) Prior Publication Data
US 2002/0130769 A1    Sep. 19, 2002

(30) Foreign Application Priority Data
Mar. 13, 2001   (JP)   ............................. 2001-071138

(51) Int. Cl.
*H04Q 1/00*   (2006.01)
(52) U.S. Cl. .................. 340/5.52; 340/5.72; 455/456.3
(58) Field of Classification Search ............... 340/5.72, 340/5.23, 5.24; 455/456.3
See application file for complete search history.

(56) References Cited

U.S. PATENT DOCUMENTS

| | | | | |
|---|---|---|---|---|
| 5,508,694 A | * | 4/1996 | Treharne et al. | 340/5.24 |
| 5,838,251 A | * | 11/1998 | Brinkmeyer et al. | 340/5.22 |
| 6,847,825 B1 | * | 1/2005 | Duvall et al. | 455/456.3 |
| 2001/0013833 A1 | * | 8/2001 | Chen et al. | 340/5.72 |
| 2002/0109583 A1 | * | 8/2002 | Losey | 340/5.72 |

FOREIGN PATENT DOCUMENTS

| | | | |
|---|---|---|---|
| JP | 62-101777 | | 5/1987 |
| JP | 66-101777 | * | 5/1987 |
| JP | 5-139248 | * | 6/1993 |
| JP | 11-93478 | * | 4/1999 |
| JP | 11-264268 | * | 9/1999 |
| JP | 2000-25571 | * | 1/2000 |
| JP | 2000-311220 | | 11/2000 |
| JP | 2001-10448 | | 1/2001 |
| JP | 2001-10498 | * | 1/2001 |
| JP | 2001-18757 | * | 1/2001 |
| JP | 2001-47973 | | 2/2001 |
| JP | 2001-253320 | * | 9/2001 |
| JP | 2001-320497 | * | 11/2001 |

* cited by examiner

*Primary Examiner*—Brian Zimmerman
(74) *Attorney, Agent, or Firm*—Jordan and Hamburg LLP

(57) ABSTRACT

A vehicle management system has an operation controller for controlling an operation of a vehicle by receiving a signal in a vehicle side mobile communication terminal provided at the vehicle, and an operating side mobile communication terminal capable of transmitting a signal to the operation controller via a mobile communication network. The operating side mobile communication terminal and the vehicle side mobile communication terminal have weak radio transceivers, and a transmission/reception of the signal can be conducted with the weak radio transceiver. The operating side mobile communication terminal includes a human body information inputting section for inputting fingerprint information, the operating side mobile communication terminal or the operation controller conducts authenticating of an operator with the input fingerprint information, and the operation controller conducts the controlling on the basis of an authentication of the operator.

16 Claims, 8 Drawing Sheets

VEHICLE MANAGEMENT SYSTEM

BACKGROUND OF THE INVENTION

1. Field of the Invention

The present invention relates to a vehicle management system.

2. Description of the Related Art

As a conventional system of this type, there is, for example, such a system as disclosed in Japanese Patent Application Laid-Open No. 2000-311220. In this conventional system, an IC card on which a memory chip or the like is mounted is employed as a driving license, while a terminal to which the driving license having the IC card or a similar function is inserted is provided in a vehicle. Further, human body authentication information detection means for detecting human body authentication information such as a fingerprint, iris, and the like of a driver is provided in the vehicle, while information which represents human body authentication information of an owner of the driving license is stored in the memory of the driving license having the IC card or the similar function. When the human body authentication information of the driver and the human body authentication information described or stored in the driving license do not coincide with each other and the contents of the driving license do not correspond to the vehicle to be driven, the operation cannot be conducted.

Therefore, there is no one who can drive the vehicle other than a specified person such as the owner of the vehicle or the like, which enables to prevent theft of the vehicle and the like.

However, since the IC card or the like is employed in the above system, a person who wishes to drive the vehicle needs to get in and conduct operation of the vehicle. Since the person who wishes to drive the vehicle is different from the person who permits the drive enabling state of the vehicle according to the operation, there has been a problem that the above system cannot be applied in a case where an operator is far from the vehicle.

Further, in the conventional system, when the operator is far from the vehicle, he/she cannot be aware of the status of the vehicle. For example, when the vehicle is stolen, the operator cannot immediately be aware of the status.

It is a first object of the present invention to provide a vehicle management system which enables an operation of a vehicle even when an operator is far from the vehicle, and can determine the status of the vehicle even when the operator is far from the vehicle.

SUMMARY OF THE INVENTION

A first aspect of the present invention provides a vehicle management system comprising operation controlling means capable of controlling an operation of a vehicle by receiving a signal at a vehicle side mobile communication terminal provided at the vehicle side, and an operating side mobile communication terminal capable of transmitting the signal to the operation controlling means via a mobile communication network.

A second aspect of the present invention provides the vehicle management system according to the first aspect, wherein the operating side mobile communication terminal and the vehicle side mobile communication terminal comprise short distance radio communication means, and a transmission/reception of the signal can be conducted using the short distance radio communication means.

A third aspect of the present invention provides the vehicle management system according to the first or second aspect, wherein the operating side mobile communication terminal comprises a human body information inputting section for inputting human body information, the operating side mobile communication terminal or the operation controlling means conducts authenticating of an operator with the input human body information, and the operation controlling means conducts the controlling on the basis of an authentication of the operator.

A fourth aspect of the present invention provides the vehicle management system according to the third aspect, wherein the human body information is fingerprint information.

A fifth aspect of the present invention provides the vehicle management system according to any one of the first to fourth aspects, wherein the operation controlling means comprises a Web function for enabling vehicle information such as status information of the vehicle to be accessible, and the operating side mobile communication terminal can fetch and display the vehicle information.

A sixth aspect of the present invention provides the vehicle management system according to the fifth aspect, wherein the vehicle information is operating information of the vehicle.

A seventh aspect of the present invention provides the vehicle management system according to any one of the first to sixth aspects, wherein the operation controlling means can register a sub operating side mobile communication terminal as a partner in addition to a main operating side mobile communication terminal which an owner, an administrator, or a main user of the vehicle operates, and a signal which the sub operating side mobile communication terminal transmits to the operation controlling means becomes effective on the basis of the signal which the main operating side mobile communication terminal transmits.

An eighth aspect of the present invention provides the vehicle management system according to the fifth aspect, wherein the vehicle comprises vehicle position detection means, and the vehicle information is vehicle position information which is detected by the vehicle position detection means.

A ninth aspect of the present invention provides the vehicle management system according to the fifth aspect, wherein the vehicle comprises theft detection means, and the vehicle information is vehicle theft information which is detected by the theft detection means.

According to the first aspect, a vehicle can receive a signal in a vehicle side mobile communication terminal with operation controlling means to control an operation of the vehicle. A person who will operate the vehicle can transmit a signal with an operating side mobile communication terminal via a mobile communication network to the operation controlling means. Therefore, the person who will operate the vehicle can accurately operate the vehicle irrespective of whether he/she is near or far from the vehicle. Accordingly, even when the vehicle is parked in a parking area far from the operator's home, the operator can accurately operate an engine. Further, when the operator causes the third party to operate the vehicle, even if the operator is far from the vehicle, the operator can release a door lock, a steering wheel lock and the like of the vehicle to start the engine, alternatively, the operator can cause the vehicle to be in a start enabling state so that the operator can cause the vehicle to be in an operation enabling state and cause the third party to operate the vehicle.

According to the second aspect, in addition to the first aspect, the operating side mobile communication terminal and the vehicle side mobile communication terminal have short distance radio communication means, and transmission/reception of the signal can be conducted also with the short distance radio communication means. Therefore, when the person who will operate the vehicle is near the vehicle, without utilizing the mobile communication network, the vehicle can be caused to be in an operating state or in the operation enabling state.

According to the third aspect, in addition to the first or the second aspect, the operating side mobile communication terminal comprises a human body information inputting section for inputting human body information, the operating side mobile communication terminal or the operation controlling means conducts authenticating of an operator with the input human body information so that the operation controlling means can conduct the controlling on the basis of the authenticating of the operator. Therefore, the operating side mobile communication terminal is operated to conduct an identification authenticating of the person who will operate the vehicle so that the vehicle can be operated. Only an authenticated operator or a specified third party can operate the vehicle.

According to the fourth aspect, in addition to the third aspect, since the human body information is fingerprint information, an identification authenticating can be accurately conducted with the fingerprint information.

According to the fifth aspect, in addition to any of the first to fourth aspects, since the operation controlling means comprises a Web function for enabling vehicle information such as status information of the vehicle to be accessible, the vehicle information can be fetched and displayed on the operating side mobile communication terminal. Therefore, even when the operator is far from the vehicle, he/she can acquire the vehicle information.

According to the sixth aspect, in addition to the fifth aspect, since the vehicle information is operating information of the vehicle, even when the operator is far from the vehicle, he/she can accurately acquire the operating information.

According to the seventh aspect, in addition to any one of the first to sixth aspects, the operation controlling means can register a sub operating side mobile communication terminal as a partner in addition to the main operating side mobile communication terminal which an owner, an administrator, or a main user of the vehicle operates. A signal which the sub operating side mobile communication terminal transmits to the operation controlling means can be effective on the basis of a signal which the main operating side mobile communication terminal transmits. Therefore, the person who operates the main operating side mobile communication terminal can operate the sub operating side mobile communication terminal to specify the person who will operates the vehicle.

According to the eighth aspect, in addition to the fifth aspect, the vehicle comprises vehicle position detection means, and the vehicle information is vehicle position information which is detected with the vehicle position detection means. Therefore, even when the operator is far from the vehicle, he/she can operate the operating side mobile communication terminal to acquire the vehicle position information and to accurately be aware of the vehicle position.

According to the ninth aspect, in addition to the fifth aspect, the vehicle comprises theft detection means, and the vehicle information is vehicle theft information which is detected with the theft detection means. Therefore, even when the operator is far from the vehicle, he/she operates the operating side mobile communication terminal to cause or automatically causes the vehicle theft information to be displayed or alarmed so that the operator can instantaneously know that the vehicle has been stolen.

DETAILED DESCRIPTION OF THE PREFERRED EMBODIMENTS

Figure 1:
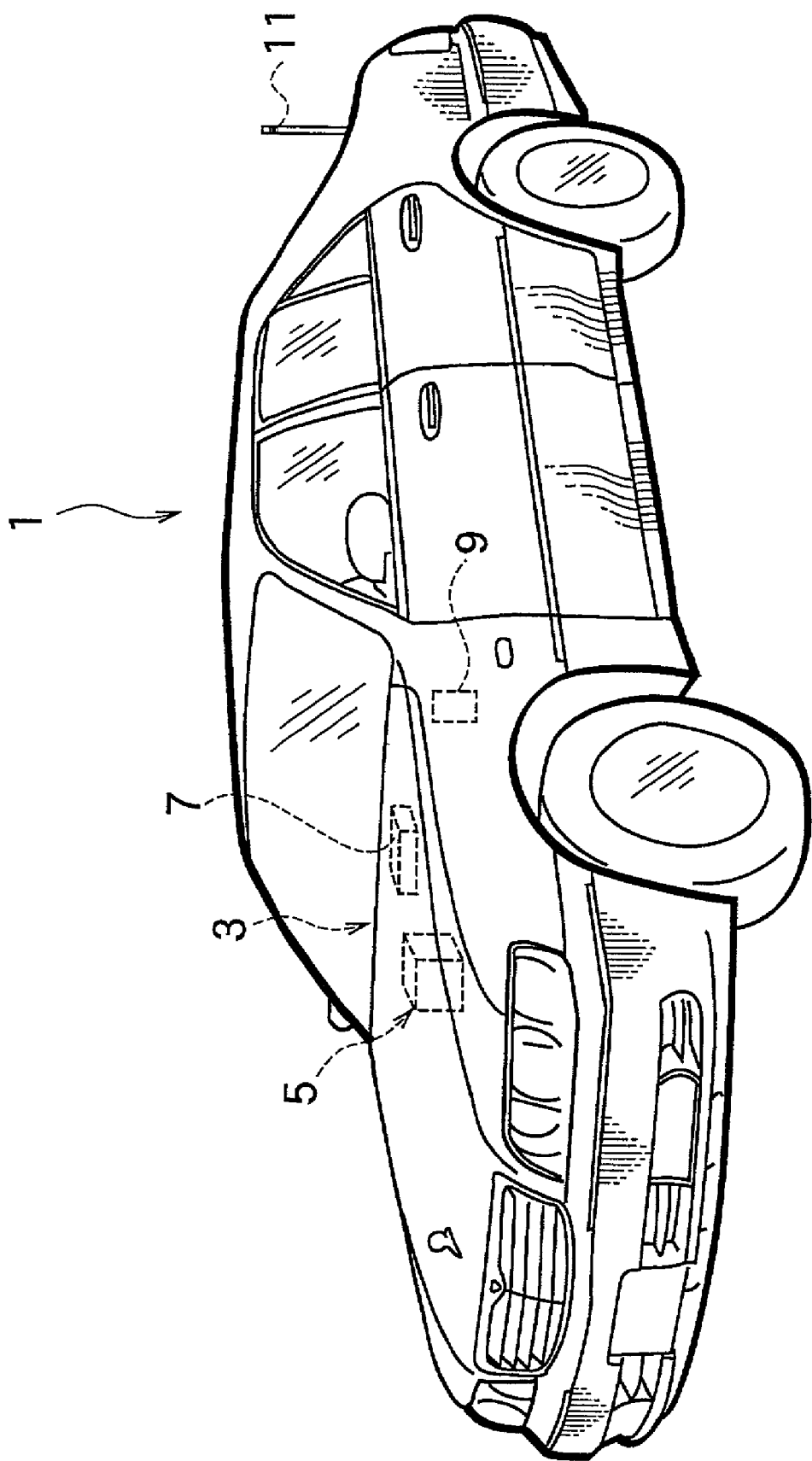
FIG. 1 is a perspective view of a vehicle according to a first embodiment of the present invention.
Figure 2:
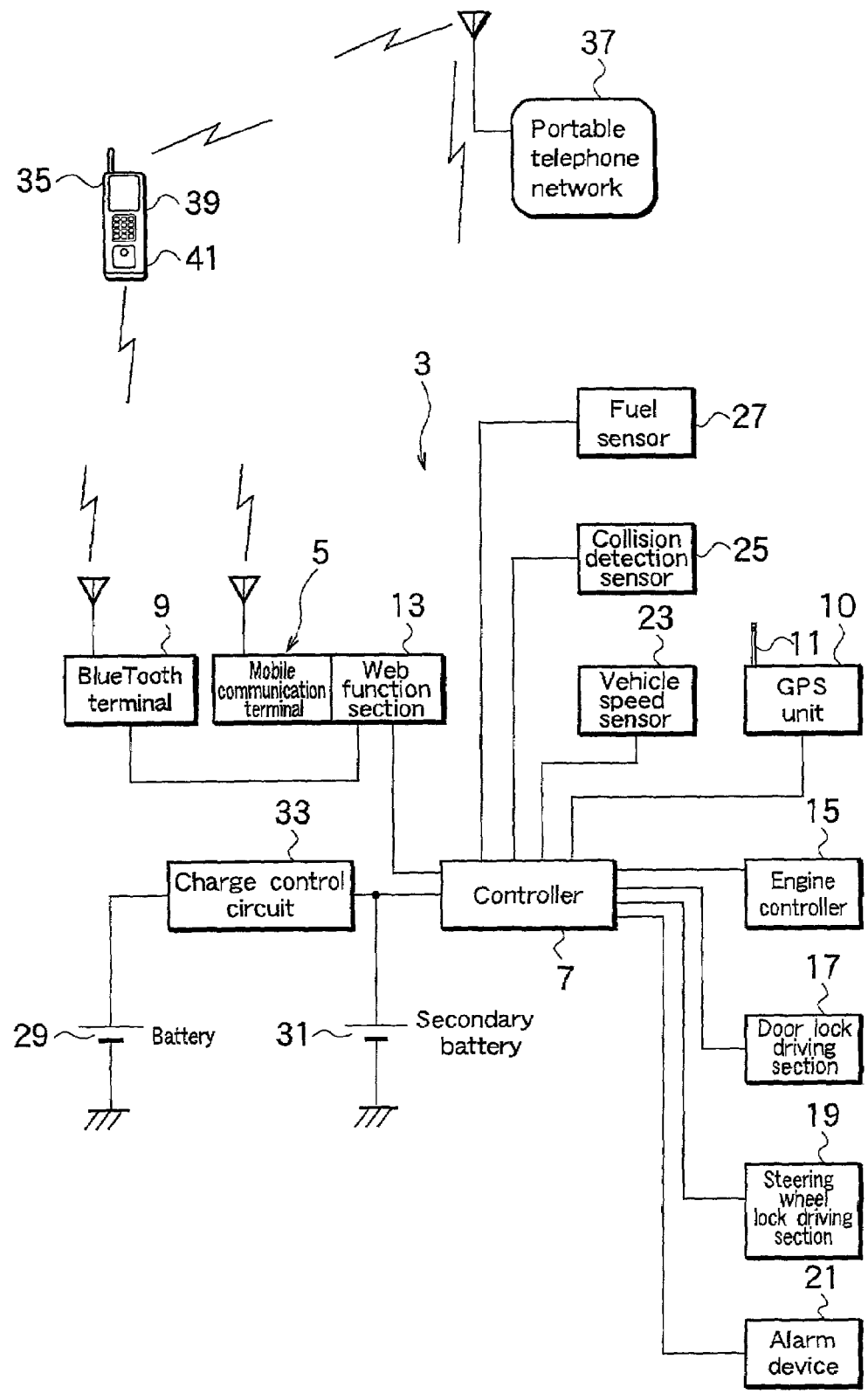
FIG. 2 is a block diagram according to the first embodiment.

FIGS. 1 and 2 are diagrams according to a first embodiment of the present invention, FIG. 1 is a perspective view of a vehicle to which a first embodiment of the present invention is applied, and FIG. 2 is a block diagram of a vehicle management system to which the first embodiment of the present invention is applied. As shown in FIG. 1, a vehicle 1 comprises a vehicle side mobile communication terminal 5 as operation controlling means 3, a controller 7, and a BlueTooth terminal 9 which is weak radio communication means as short distance radio communication means. Further, the vehicle 1 is provided with a GPS antenna 11 of a GPS unit 10 (FIG. 2). A GPS signal is configured to be input to the GPS unit 10 through the GPS antenna 11.

The controller 7 is configured of a microcomputer or the like, and comprises a MPU board and the like. The vehicle side mobile communication terminal 5 and the BlueTooth terminal 9 are connected to a Web function section 13, and the Web function section 13 is connected to the controller 7. The Web function section 13 sequentially acquires various vehicle information such as an engine status, a door lock status, a steering wheel lock status, an alarm device output status, a vehicle collision status, a vehicle speed status, a fuel status, a vehicle position status and the like from the controller 7. The vehicle side mobile communication terminal 5 has a function of dividing data of the Web function section 13 to transmit it as a packet. Therefore, the operation controlling means 3 comprises a Web function for causing vehicle information such as the engine status information of the vehicle 1 to be accessible.

To the controller 7 are connected an engine controller 15, a door lock driving section 17, a steering wheel lock driving section 19 and an alarm device driving section 21, respectively. When a signal is output from the controller 7, the engine controller 15 causes an engine to start or to be in a start enabling state. Therefore, when the engine start enabling state is caused, a driver can press an engine start button or operate an ignition key to start the engine.

When a signal is not output from the controller 7 to the engine controller 15, the engine cannot be started. Alternatively, even if the engine can be started, a running disable state is caused due to a control in which, for example, when an accelerator pedal is stepped on, a throttle is not opened. Further, the controller 7 can be configured such that, when an identification authenticating described later cannot be conducted, a gear changing or a parking brake releasing cannot be conducted.

When a signal is output from the controller 7, the door lock driving section 17 and the steering wheel lock driving section 19 release a door lock and a steering wheel lock of the vehicle, respectively. When a signal is not output from the controller 7, the locked states thereof are maintained. When a signal is output from the controller 7, the alarm device 21 conducts alarming, and when a signal is not output from the controller 7, the alarming is not conducted.

To the controller 7 are further connected the GPS unit 10, a vehicle speed sensor 23, a collision detecting sensor 25, a fuel sensor 27 and the like. Position information of the vehicle is input into the controller 7 with the GPS unit 10, vehicle speed information is input into the controller 7 with the vehicle speed sensor 23, collision presence/absence information is input into the controller 7 with the collision detecting sensor 25, and remaining fuel amount information is input into the controller 7 with the fuel sensor 27.

To the controller 7 are connected a battery 29 and a secondary battery 31 as a power source. The secondary battery 31 is configured to be charged with a vehicle mounted type motor, a regenerative braking, a solar battery or the like via a charge control circuit 33. Therefore, even if the battery 29 is disable due to an accident or the like, a power is supplied from the secondary battery 31 to the controller 7 so that an operation of the controller 7 is enabled. Meanwhile, an operating side mobile communication terminal 35 is configured of a mobile telephone, a PHS(Personal Handy-Phone System), or the like. This operating side mobile communication terminal 35 is directed for transmitting a signal to the vehicle side mobile communication terminal 5 of the vehicle 1 via, for example, a mobile telephone network 37 as a mobile communication network. In the present embodiment, the operating side mobile communication terminal 35 has a packet multiplexing function in addition to a mobile telephone function so that the Web function can be displayed on a display screen 39. Therefore, the operating side mobile communication terminal 35 can fetch to display the vehicle information of the operation controlling means 3.

A BlueTooth terminal is incorporated as the weak radio communication means into the operating side mobile communication terminal 35. This operating side mobile communication terminal 35 is provided with a human body information inputting section 41. As human body information to be input, a fingerprint is employed in the present embodiment, however, information such as iris information of an eye, a DNA, a voice print, a vein of a back of the hand, and the like can be employed.

A configuration is employed in which fingerprint information input with the human body information inputting section 41 is collated with operator's own fingerprint information which is registered in the operating side mobile communication terminal 35 or the operation controlling means 3 so that an identification authenticating of the registered operator is conducted. Further, fingerprint information to be registered comprises a database of separately registered fingerprint information, therefore, a configuration can be employed in which the fingerprint information is downloaded from the database so that the identification authenticating is conducted in the operating side mobile communication terminal 35 or the operation controlling means 3.

Therefore, a person who will start the vehicle 1, at first, inputs fingerprint information of, for example, a thumb from the human body information inputting section 41 of the operating side mobile communication terminal 35. Through this inputting, the identification authenticating of the registered operator is conducted with, for example, the operating side mobile communication terminal 35. When the identification authenticating is conducted, a use of the operating side mobile communication terminal 35 is enabled.

Next, the operating side mobile communication terminal 35 is operated to output a signal such as an operation signal, an operation enabling signal or the like. This signal is input into the vehicle side mobile communication terminal 5 via the mobile telephone network 37, or directly into the BlueTooth terminal 9. When the operator is near the vehicle 1, the BlueTooth terminal 9 is used. When the operator is far from the vehicle 1 and a weak radio communication is disabled, a communication via the mobile telephone network 37 is conducted.

An operator's own number of the operating side mobile communication terminal 35 has been registered into the vehicle side mobile communication terminal 5 in advance. When the vehicle side mobile communication terminal 5 receives a signal and the number coincides therewith, a signal is output from the controller 7 to the engine controller 15, the door lock driving section 17, and the steering wheel lock driving section 19. Thereby, for example, when the engine start button of the vehicle 1 is pressed, the engine is started. In addition, the door and the steering wheel each are to be an unlocked state through the signal.

Further, through a menu display of the operating side mobile communication terminal 35, alone or a combination of a signal output only to the engine controller 15, a signal output only to the door lock driving section 17, and a signal output only to the steering wheel lock driving section 19 can be selected to be conducted. Further, a configuration can be employed in which, when the signal output only to the engine controller 15 is conducted, the engine can be directly started. Further, a configuration can be employed in which, when the fingerprint information of, for example, a thumb is input from the human body information inputting section 41 of the operating side mobile communication terminal 35 and the operation signal or the operation enabling signal is transmitted to the operation controlling means 3 through the operation of the operating side mobile communication terminal 35, the identification authenticating is conducted by the registered fingerprint information at the operation controlling means 3 to conduct the above controlling.

Through the operation of the operating side mobile communication terminal 35, information can be fetched from the Web function section 13 to display on the Web display section 39. Therefore, even when the operator is far from the vehicle 1, he/she can confirm the Web display section 39 to immediately be aware of the engine status, the door lock status, the steering wheel lock status, the vehicle speed status, the collision presence/absence status, the vehicle position status and the like.

When, even though the operation signal or the operation enabling signal is not output from the operating side mobile communication terminal 35 or the identification authenticating is not conducted at the operation controlling means 3, the door lock or the steering wheel is unlocked, the controller 7 outputs a signal to the alarm device 21. On reception of this signal, the alarm device 21 conducts alarming, which can prevent a theft from occurring. At this time, an alarm signal is issued from the vehicle side mobile communication terminal 5 or the BlueTooth terminal 9 so that an alarm sound is generated in the operating side mobile communication terminal 35 or an alarm display is conducted in the Web display section 39. Therefore, even when the operator is far from the vehicle 1, he/she can immediately be aware of the theft status of the vehicle. Therefore, in the present embodiment, the controller 7, the engine controller 15, the door lock driving section 17, and the steering wheel lock driving section 19 configure a theft detecting means.

Figure 3:
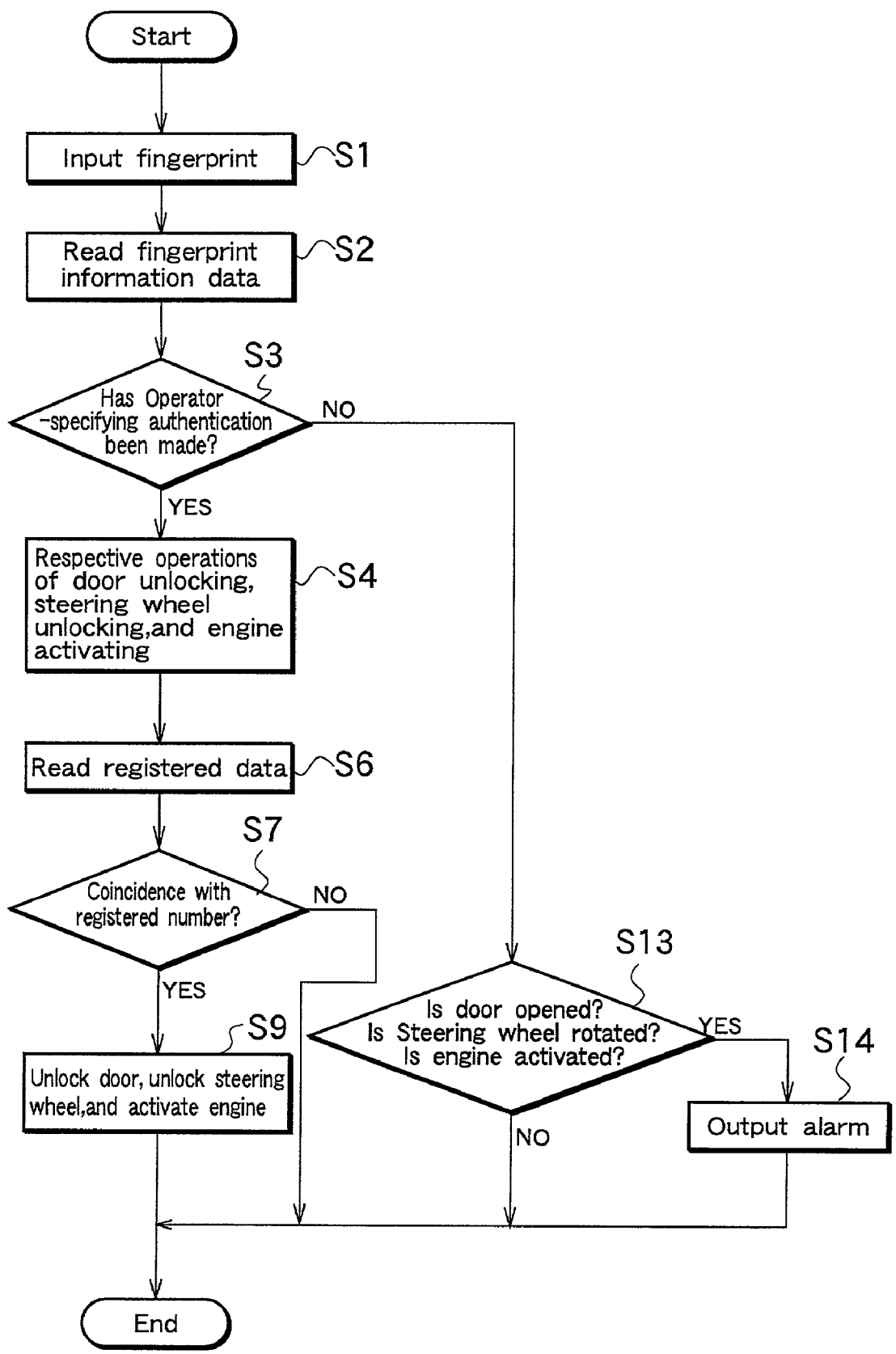
FIG. 3 is a flow chart according to the first embodiment.

FIG. 3 is a flow chart according to the first embodiment. At first, in step S1, a fingerprint input is conducted. This fingerprint input is conducted with the human body information inputting section 41 of the operating side mobile communication terminal 35 as described above. When the fingerprint input in step S1 is conducted, a control proceeds to step S2, where fingerprint information data reading is conducted, and in step S3, an operator specification authenticating (identification authenticating) is conducted. The fingerprint information data reading in the step S2 and the operator specification authenticating in step S3 are conducted in the operating side mobile communication terminal 35.

When the identification authenticating is conducted with the operator specification authenticating in the step S3, an input with the operating side mobile communication terminal 35 is enabled, and the control proceeds to step S4. In step S4, a reading of respective operations of a door unlocking, a steering wheel unlocking and an engine activating is conducted. The operations are conducted by inputting the number of the operating side mobile communication terminal 35. For example, a door unlocking signal, a steering wheel unlocking signal, and an engine start enabling signal are transmitted to the operation controlling means 3, and the numbers thereof are read.

Next, the control proceeds to step S6, where a registered data reading processing is conducted. In this processing, a registered telephone number is read with the vehicle side mobile communication terminal 5, and the control proceeds to step S7. In step S7, a determination processing is conducted on whether the telephone number coincides with the registered number or not. In this processing, when the read registered number and the telephone number of the operating side mobile communication terminal 35 coincide with each other, the control proceeds to step S9, and when the numbers do not coincide with each other, the processing is terminated.

In the step S9, processings of the door unlocking, the steering wheel unlocking, and the engine activating are conducted. With these processings, a signal is output from the controller 7 to the door lock driving section 17 and the steering wheel lock driving section 19 so that the door lock and the steering wheel of the vehicle 1 are unlocked. Further, with the signal output to the engine controller 15, the engine of the vehicle 1 is put in a starting state. Further, through the menu display of the operating side mobile communication terminal 35, the engine controller 15 can select either that the engine is in a start enabling state without starting the engine or that the engine is in the engine starting state. In the case the engine is in the start enabling state, the engine start is conducted according to pressing the engine start button.

In the step S3, when the identification authenticating has not been conducted, the control proceeds to step S13, where a determination processing is conducted on whether the door opening, the steering wheel rotating, or the engine activating is conducted or not. With this processing, when, even though the identification authenticating is not conducted, the door is unlocked due to an external factor so that the door is opened, or the steering wheel is unlocked so that the steering wheel is rotated, or the engine has been started, the control proceeds to step S14. In step S14, a processing of the alarm output is conducted.

With this processing of the alarm output, the alarm output is conducted from the alarm device 21.

With the above control, through the operation of the operating side mobile communication terminal 35, the vehicle 1 can be in an operation enabling state. In other words, not only when the operator is near the vehicle 1 but also when he/she is far from the vehicle 1, with the operation of the operating side mobile communication terminal 35, the vehicle 1 can be in the operation enabling state.

For example, when the vehicle 1 is parked in a garage at his/her home, the BlueTooth terminal 9 receives the signal so that the vehicle 1 is, for example, in the engine start state, the door unlocked state, or the steering wheel unlocked state. Further, when the vehicle 1 is parked at a parking area far from his/her home, in winter or summer season, with the operation of the operating side mobile communication terminal 35, only the engine is started with the door locked state and the steering wheel locked state maintained and the air conditioner in the vehicle 1 is operated at the same time so that the inside of the vehicle can be warmed or cooled. Even in this case, only the engine is started with a menu selection of the operating side mobile communication terminal 35, therefore, the door lock 17 and the steering wheel lock 19 can be maintained in the locked state so that the vehicle is prevented from being stolen.

In addition, in the first embodiment, steps S6 and S7 can be omitted.

Figure 4:
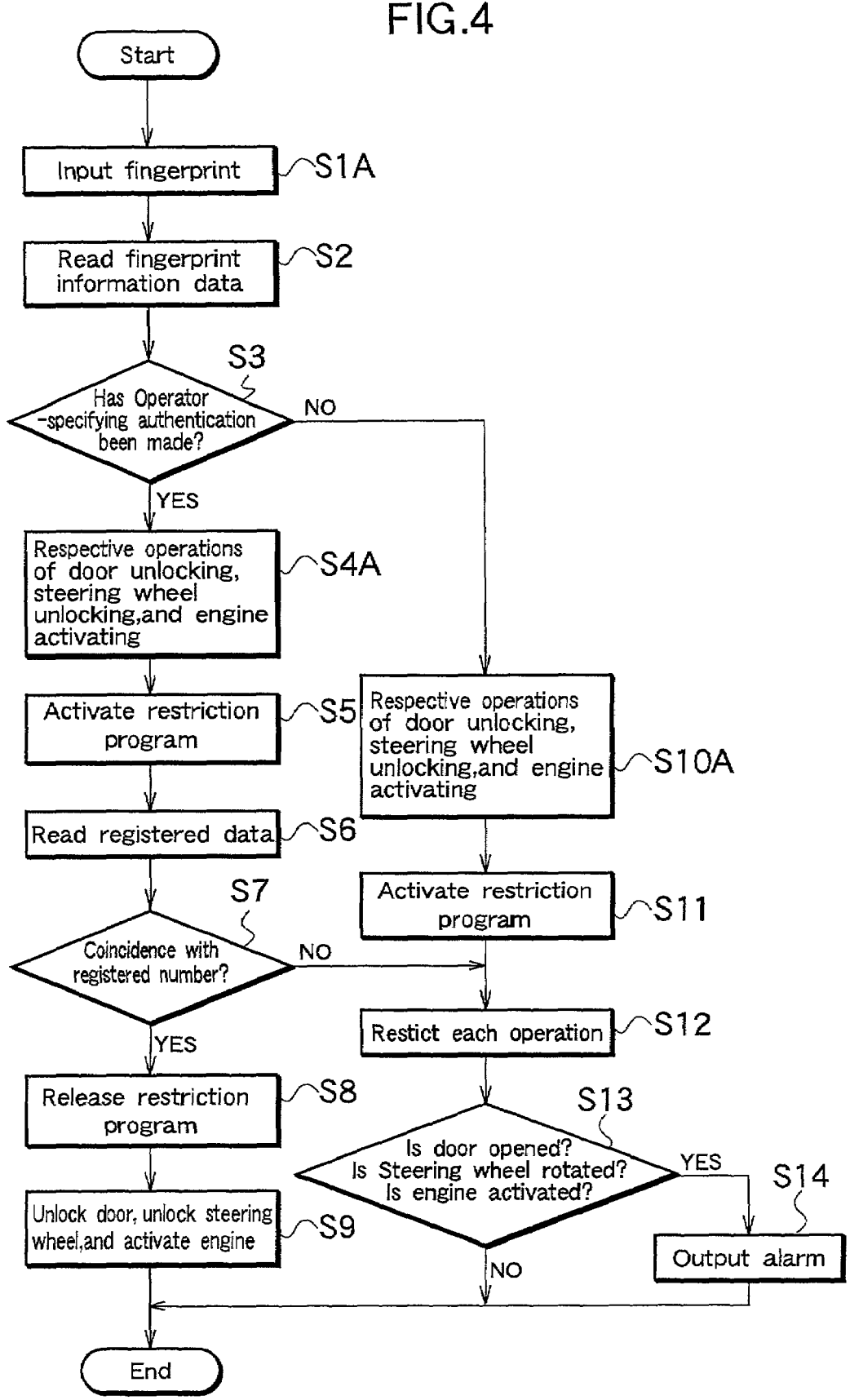
FIG. 4 is a flow chart according to a modified embodiment of the first embodiment.

FIG. 4 is a flow chart according to a modified embodiment of the first embodiment of the present invention. The embodiment in FIG. 4 shows an example in which the operator identification authenticating is conducted at the operation controlling means 3. Therefore, the flow chart in FIG. 4 is configured such that steps S5, S8, S11 and S12 are further added to the flow chart in FIG. 3. Further, in FIG. 4, steps corresponding to those in FIG. 3 are denoted with like numerals.

In FIG. 4, only processing in step S1A is performed by operation in the operating side mobile communication terminal 35. On a fingerprint input in step S1A, the respective operations of the door unlocking, the steering wheel unlocking, and the engine activating with the operation of the operating side mobile communication terminal 35 are conducted through the number input and the like. The identification authenticating in steps S2 and S3 is conducted by the vehicle side mobile communication terminal 5, the controller 7, or the like.

In step S4A, the reading processing for the door unlocking, the steering wheel unlocking, and the engine activating operations which have been input in step S1A is conducted. The control proceeds to step S5.

In step S5, a restriction program activation is conducted so that an activation restriction program is started in the engine controller 15.

Next, after the reading of the registered data in step S6, as a result of a determination in step S7, when the read data coincides with the registered number, in step S8, the restriction program is released, in step S9, the processings of the door unlocking, the steering wheel unlocking, and the engine activating are conducted. With these processings, similarly to the above description, the vehicle 1 can be in the operation enabling state. In step S7, when the read data does not coincide with the registered number, the control proceeds to step S12.

In the step S3, when the identification authenticating has not been conducted, the control proceeds to step S10A, where the reading processing of the respective operations of the door unlocking, the steering wheel unlocking, and the engine activating through the input in the step S1A is conducted.

In step S11, the restriction program activation processing is conducted. In other words, since, in step S3, the identification authenticating has not been conducted, it is determined that a person other than the owner, the administrator, or mainly the user of the vehicle who is an original operator operates the operating side mobile communication terminal 35 so that, in step S12, the processing of each operation restriction is conducted. With this processing, the restriction program is maintained, in step S13, a determination is made on whether the door opening, the steering wheel rotating, or the engine activating has been conducted or not. When it is determined that the door has been unlocked so that the door is opened, or that the steering wheel has been unlocked so that the steering wheel is rotated, or that the engine has been started, the control proceeds to step S14, where the processing of the alarm output is conducted. With this processing of the alarm output, the alarm output is conducted from the alarm device 21.

Therefore, also in the embodiment in FIG. 4, the operator identification authenticating is conducted at the operation controlling means 3 so that similar effects to those in the embodiment in FIG. 3 can be obtained.

Figure 5:
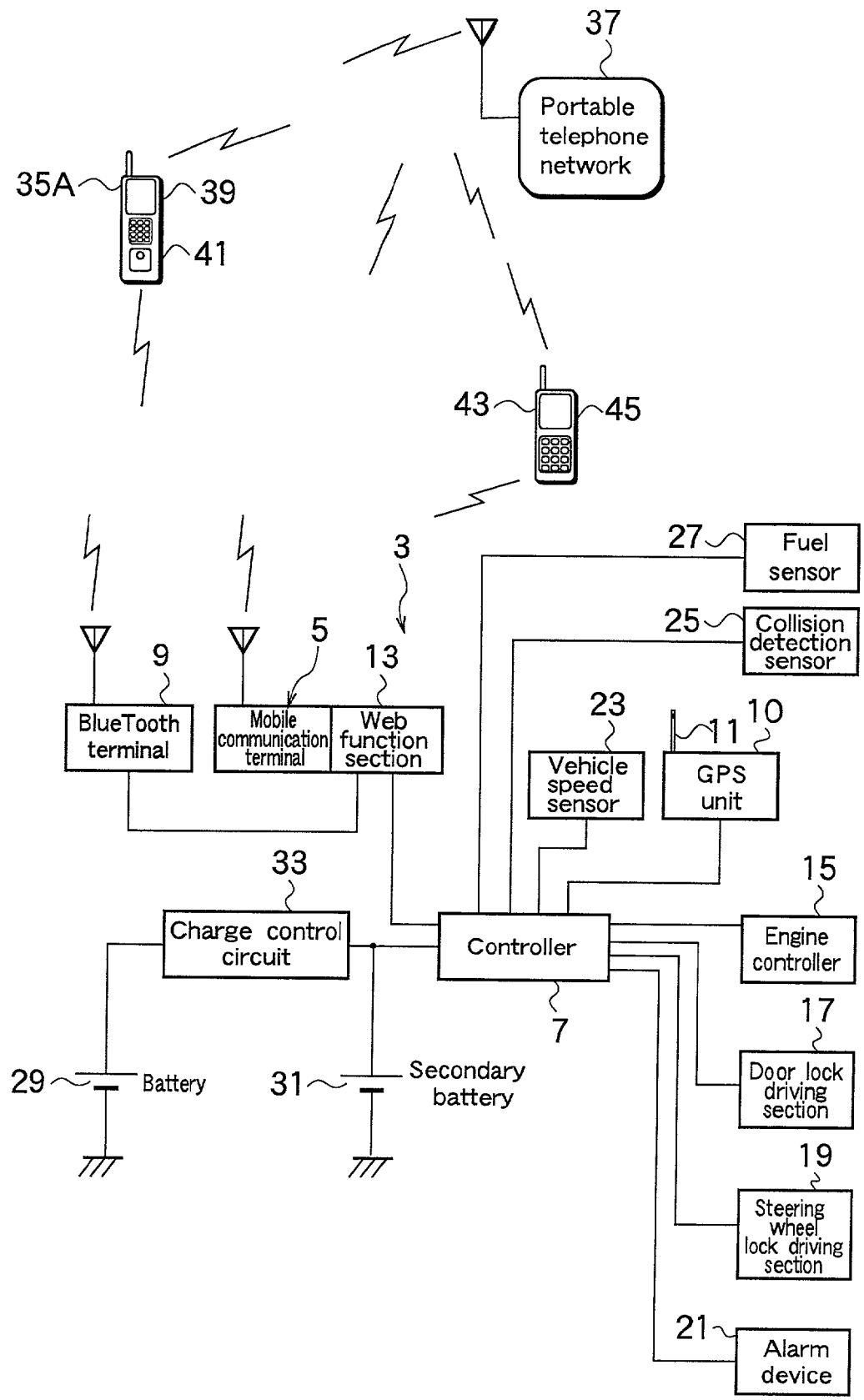
FIG. 5 is a block diagram according to a second embodiment of the present invention.
Figure 6:
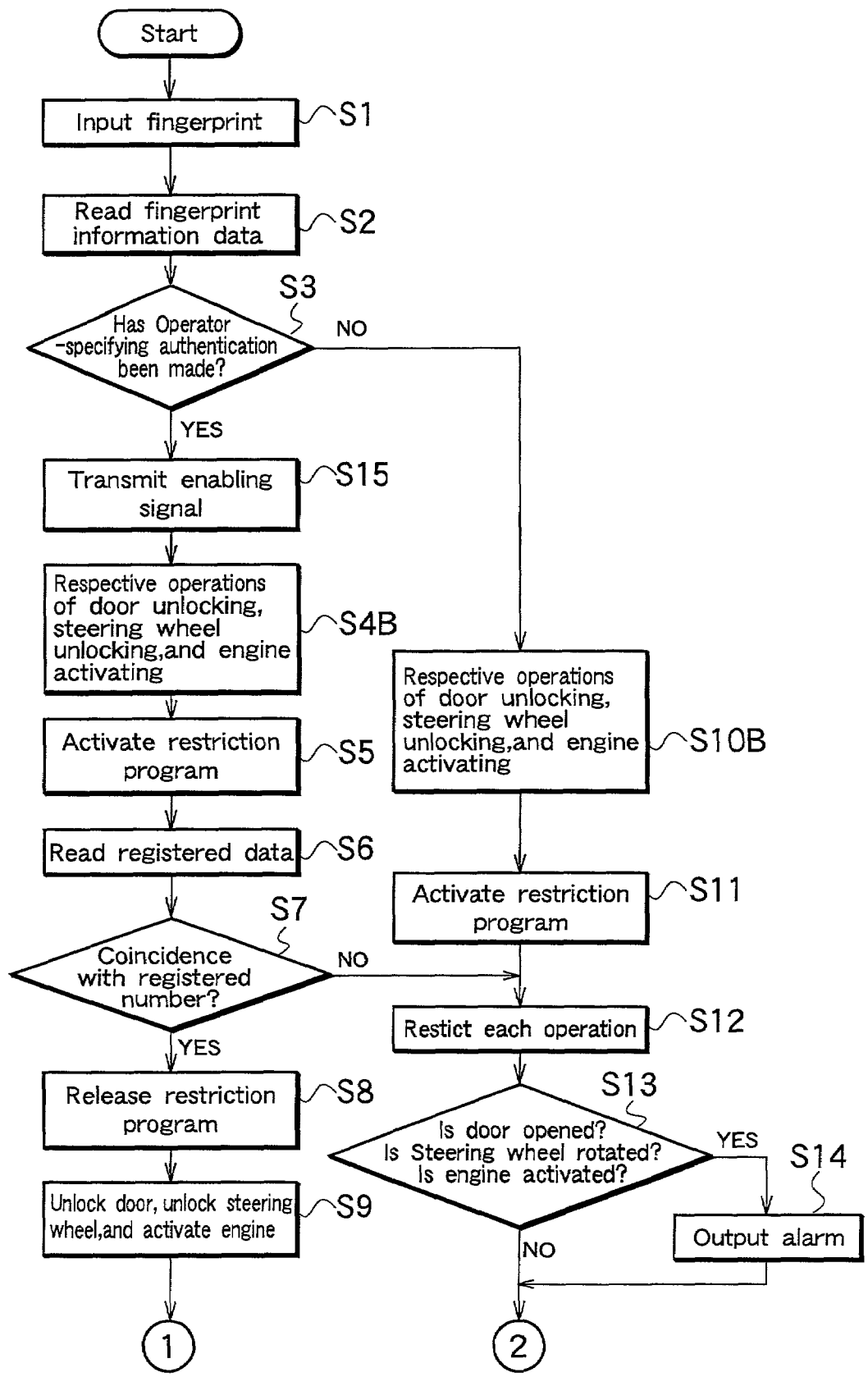
FIG. 6 is a flow chart according to the second embodiment.
Figure 7:
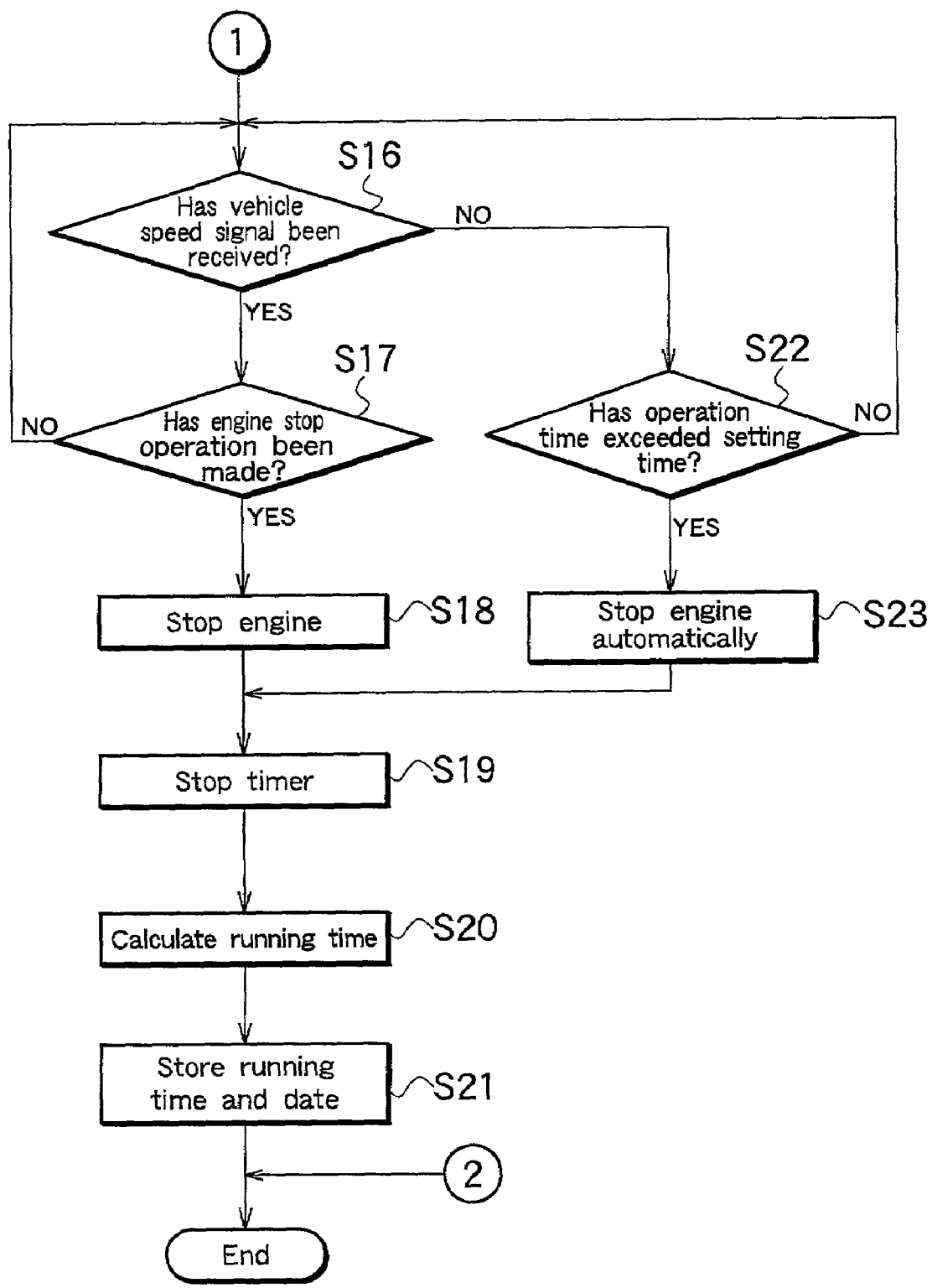
FIG. 7 is a flow chart according to the second embodiment.

FIGS. 5 to 7 show a second embodiment of the present invention. FIG. 5 is a block diagram according to the second embodiment, and FIGS. 6 and 7 are flow charts according to the second embodiment. FIG. 5 corresponds to the block diagram in FIG. 2 according to the first embodiment. In addition, constituents corresponding to those in the first embodiment are denoted with like numerals.

In the present embodiment, in addition to the main operating side mobile communication terminal 35A which the owner, the administrator, or mainly the user of the vehicle operates, a sub operating side mobile communication terminal 43 is provided. Also in this sub operating side mobile communication terminal 43, a Web display section 45 is provided and a BlueTooth terminal is incorporated. This sub operating side mobile communication terminal 43 also comprises the packet multiplexing function in addition to the mobile telephone function. Further, in order to simplify the explanation in the second embodiment, only one sub operating side mobile communication terminal 43 is shown, however, two or more can be provided. In the vehicle side mobile communication terminal 5, in addition to the main operating side mobile communication terminal 35A, the sub operating side mobile communication terminal 43 is registered as a partner. The operation signal, the operation enabling signal, or the like which the sub operating side mobile communication terminal 43 transmits to the operation controlling means 3 becomes effective when the main operating side mobile communication terminal 35A transmits the enabling signal to the operation controlling means 3.

A flow chart in FIG. 6 corresponds to the flow chart in FIG. 4 according to the modified example of the first embodiment, and similarly comprises steps S1 to S14. In addition, contents of the present embodiment can be applied to the flow chart in FIG. 3 according to the first embodiment. Further, in the present embodiment, the identification authenticating with the processings in steps S1, S2, and S3 is conducted by the main operating side mobile communication terminal 35A.

In step S3, after the operator identification authenticating is conducted, in step S15, the enabling signal is transmitted. This enabling signal denotes that the identification authenticating has been conducted, and is output on the basis of the operation of the main operating side mobile communication terminal 35A.

After the enabling signal is output in step S15, the control proceeds to step S4B, where the respective operations of the door unlocking, the steering wheel unlocking, and the engine activating are read. These respective operations are conducted with, for example, the operation of the sub operating side mobile communication terminal 43. Of course, the respective operations in the step S4 can be also conducted with the operation of the main operating side mobile communication terminal 35A. As a result of the operation reading in step S4B, in step S5, the restriction program activation is conducted so that, in the engine controller 15, the activation restriction program is started.

Next, after the reading of the registered data in step S6, as a result of the determination in step S7, when the read data coincides with the registered number, in step S8, the restriction program is released, and in step S9, the processings of the door unlocking, the steering wheel unlocking, and the engine activating are conducted. With the processing, similarly to the above description, the vehicle 1 can be set in the operation enabling state. In step S7, when the read data does not coincide with the registered number, the control proceeds to step S12.

In the step S3, when the identification authenticating has not been conducted, the control proceeds to step S10B, where the reading processing of the respective operations of the door unlocking, the steering wheel unlocking, and the engine activating is conducted with the sub operating side mobile communication terminal 43. Of course, each operation in this step SLOB can be also conducted in the main operating side mobile communication terminal 35A.

In step S11, the restriction program activation processing is conducted, in step S12, each operation restriction processing is conducted. With this processing, the restriction program is maintained, in step S13, a determination is made on whether the door opening, the steering wheel rotating, or the engine activating is conducted or not. When it is determined that the door has been unlocked so that the door is opened, or that the steering wheel has been unlocked so that the steering wheel is rotated, or that the engine has been started, the control proceeds to step S14, where the processing of the alarm output is conducted. With the processing of the alarm output, the alarm output is conducted from the alarm device 21.

In the step S9, after the vehicle 1 is operated, the control proceeds to a flow chart in FIG. 7. In step S16 in FIG. 7, a determination is made on whether a vehicle speed signal exists or not. When the vehicle is stopped and the vehicle speed signal does not exist, the control proceeds to step S22, where a determination is made on whether a stopping time has exceeded a setting time or not. In this step S22, a determination is made on whether a constant time has elapsed since the vehicle was stopped. When the vehicle has been stopped more than the constant time, in step S23, an engine automatic stop is conducted so that the engine is stopped.

In the step S16, when the vehicle is running and it is determined that the vehicle speed signal exists, the control proceeds to step S17, where a determination is made on whether an engine stopping operation has been made or not. When it is determined that the engine stopping operation has been made, in step S18, the engine stop operation is made so that the engine is stopped. Next, in step S19, a timer at that time is recorded, in step S20, a running time calculation is conducted so that the running time counted with the timer is calculated.

In step S21, the running time and the running date are stored. In other words, with this storage, it is possible to determine the running date of the vehicle and the running time thereof.

Further, in the present embodiment, for example, when a person who is operating the main operating side mobile communication terminal 35A is far from the vehicle 1, and the third party who operates the sub operating side mobile communication terminal 43 is near the vehicle 1, the main operating side mobile communication terminal 35A is operated to give an enabling signal, and the third party operates the sub operating side mobile communication terminal 43 to cause the BlueTooth terminal 9 to receive the enabling signal so that the vehicle 1 is caused to be in the operation enabling state and the third party can run or drive the vehicle 1.

In this case, as in the first embodiment, when only the main operating side mobile communication terminal 35A far from the vehicle 1 is operated the door and the steering wheel are unlocked and the engine is started to allow the third party to operate the vehicle. However, when, in the state where the third party is closing to the vehicle 1 but has not been arrived, the engine starting or the like is conducted, even though nobody is near the vehicle 1, the vehicle 1 is set in the operation enabling state, which is not preferable in the interests of crime prevention. Therefore, the person who operates the main operating side mobile communication terminal 35A needs to make contact with the third party and conduct the releasing operation or the like only when the third party arrives the vehicle 1.

However, if it takes a long time for the third party to be aware of the position of the vehicle 1, it is complicated for the person who operates the main operating side mobile communication terminal 35A to make contact with the third party.

A configuration is employed in which only the enabling signal is issued in the main operating side mobile communication terminal 35A, thereafter, when the third party arrives at the vehicle 1, he/she operates the sub operating side mobile communication terminal 43 to cause the Blue-Tooth terminal 9 to receive the enabling signal so that the vehicle 1 is set in the operation enabling state. Therefore, the person who operates the main operating side mobile communication terminal 35A can do other activities without being annoyed with making contact with the third party. At this time, after the enabling signal is issued in the main operating side mobile communication terminal 35A, the sub operating side mobile communication terminal 43 is operated to cause information of the vehicle 1 to be displayed on the Web display section 45. Thereby, the position of the vehicle 1 is confirmed so that the third party who operates the sub operating side mobile communication terminal 43 can instantaneously arrive the vehicle 1.

As described above, since the running time and date are stored, information about a person who operates the sub operating side mobile communication terminal 43 to drive the vehicle 1, his/her drive start time, his/her driving time or the like can easily be managed. Of course, the information about the running time and the data can be displayed on the Web display section 39 of the main operating side mobile communication terminal 35A so that it is easy to conduct the running management of the employees or drivers.

Further, when a plurality of the sub operating side mobile communication terminals 43 are provided, the respective numbers thereof have been registered so that a name of each operator can be easily determined. Further the name is caused to be displayed on the Web display section 39 of the main operating side mobile communication terminal 35A so that it is remarkably easy to manage a person who drove the vehicle, his/her drive date and his/her drive time period.

Further, in the present embodiment, the above management is effective even when one person in a family has the main operating side mobile communication terminal 35A and other persons in the family each have the sub operating side mobile communication terminal 43. For example, a case is considered in which the person who has the main operating side mobile communication terminal 35A operates to park the vehicle 1 at a parking area around the station and he/she goes to business, and cannot come back home due to some reasons. At this time, with the enabling signal of the main operating side mobile communication terminal 35A, other persons in the family can operate the sub operating side mobile communication terminal 43 to place the vehicle 1 in the operation enabling state. In this case, it is convenient for the other person in the family to stay at home, however, in some cases, he/she is out and does not have the key of the vehicle 1. Even in such a case, the other person in the family can accurately be aware of the position of the vehicle 1 and place the vehicle 1 in the operation enabling state so that the other person does not need to temporally return to home and can accurately move the vehicle 1 from the parking area around the station.

Figure 8:
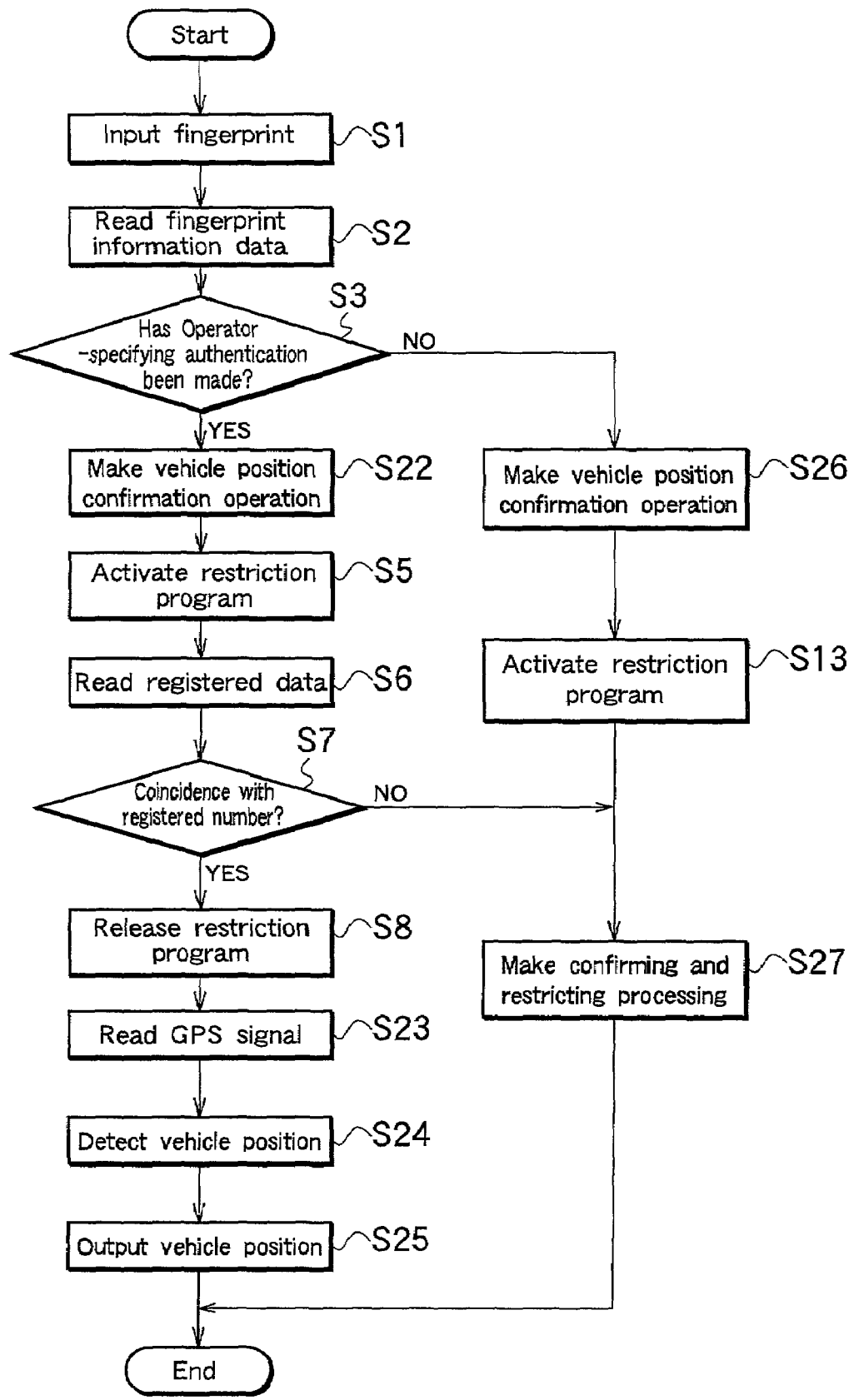
FIG. 8 is a flow chart according to a third embodiment of the present invention.

FIG. 8 is a flow chart according to a third embodiment. In the present embodiment, the flow chart is shown in the case where, with the operating side mobile communication terminals 35, 35A, and 43, the vehicle position of the vehicle 1 is confirmed. Steps corresponding to those in the above flow chart are denoted with like numerals.

Therefore, steps S1, S2, S3, S5, S6, S7, and S8 in FIG. 8 correspond to the respective steps in FIG. 4 and the like, similar processings are conducted. In the present embodiment, after the identification authenticating is conducted, in step S22, a vehicle position confirmation operation processing is conducted. With this operation, for example, with the operating side mobile communication terminal 35 as a representative example, with the menu operation of the operating side mobile communication terminal 35, a signal for the vehicle position confirmation is output.

With the operation of the operating side mobile communication terminal 35, the identification authenticating is conducted, when the read data coincides with the registered number, in step S8, the restriction program releasing is conducted, in step S23, a GPS signal reading processing is conducted. With this processing, a GPS signal is read in the GPS unit 10 in FIG. 2.

In step S24, a vehicle position retrieval processing is conducted. With this processing, the vehicle position is confirmed from map information stored in the GPS unit 10 to be output to the controller 7. In step S25, the vehicle position output processing is conducted. With this processing, the vehicle position information is displayed on the map, and caused to be output from the Web function section 13 and to be displayed on the Web display section 39 of the operating side mobile communication terminal 35.

Further, in step S3, when the identification authentication has not been conducted, in step S26, even if the vehicle position confirmation operation is conducted, the restriction program activation in step S13 is maintained by conducting the confirmation restriction processing in step S27 so that an access in the operating side mobile communication terminal 35 can not be conducted. With such processings, even when the vehicle 1 is stolen, the owner or the like of the vehicle 1 causes the Web display section 39 to display the position of the vehicle 1, and can easily be aware of the vehicle position. Further, in the case of the second embodiment, the person who operates the main operating side mobile communication terminal 35A can operate the sub operating side mobile communication terminal 43 to easily confirm the position of the running vehicle 1.

The vehicle 1 can conduct the door unlocking, the steering wheel unlocking, or the engine activating with the ignition key. In this case, with the enabling signal of the operating side mobile communication terminals 35 and 35A, the key operation can be enabled.

What is claimed is:

1. A vehicle management system for allowing vehicle control by persons including a main user and a sub user, comprising:
    a vehicle side mobile communication terminal disposed in a vehicle and configured to receive and send transmissions of wireless signals including cellular phone transmissions of signals;
    a vehicle operation controller disposed in the vehicle and configured to control an operation of the vehicle in response to said signals received by the vehicle side mobile communication terminal;
    a main operating side mobile communication terminal in the form of a first cellular phone portable by the main user and configured to transmit cellular phone transmissions of an enabling signal and a main terminal operation signal to the vehicle operation controller directly via said vehicle side mobile communication terminal and a cellular phone network from a location outside of said vehicle, the main terminal operation signal controlling operation of said vehicle from outside of said vehicle via said vehicle operation controller;
    a sub operating side mobile communication terminal in the form of a second cellular portable by the sub user and for transmitting a sub terminal operation signal for controlling operation of the vehicle from outside of said vehicle via said vehicle operation controller and said vehicle side mobile communication terminal; and
    said vehicle operation controller including:
        means, responsive to said main terminal operation signal, for effecting control of said vehicle based on receipt of said main terminal operation signal from outside of said vehicle; and
        enabling means, responsive to receipt of the enabling signal provided in a cellular phone transmission transmitted by said main operating side mobile communication terminal and received by said vehicle side mobile communication terminal directly via said cellular phone network, for allowing the sub terminal operation signal from the sub operating side mobile communication terminal to control vehicle operation from outside of said vehicle when the enabling signal is received from said main operating side mobile communication terminal via said cellular phone network, and for preventing the sub terminal operation signal from the sub operating side mobile communication terminal from controlling vehicle operation when the enabling signal is not previously received.

2. A vehicle management system according to claim 1, wherein the main and sub operating side mobile communication terminals and the vehicle side mobile communication terminal include short distance radio communication means, and transmission/reception of the sub terminal operation signal can be conducted also using the short distance radio communication means.

3. A vehicle management system according to claim 1 or 2, wherein:
    the main operating side mobile communication terminal comprises a human body information inputting section for inputting human body information;
    the main operating side mobile communication terminal or the vehicle operation controller conducts authenticating of an operator with the input human body information; and
    the vehicle operation controller conducts the controlling on the basis of an authentication of the operator.

4. A vehicle management system according to claim 3, wherein the human body information is fingerprint information.

5. A vehicle management system according to claim 1 or 2, wherein:
    the vehicle operation controller comprises a Web function for enabling vehicle information such as status information of the vehicle to be accessible; and
    the main operating side mobile communication terminal can fetch and display the vehicle information.

6. A vehicle management system according to claim 3, wherein;
    the vehicle operation controller comprises a Web function for enabling vehicle information such as status information of the vehicle to be accessible; and
    the main operating side mobile communication terminal fetches and displays the vehicle information.

7. A vehicle management system according to claim 4, wherein:
    the vehicle operation controller comprises a Web function for enabling vehicle information such as status information of the vehicle to be accessible; and
    the main operating side mobile communication terminal fetches and displays the vehicle information.

8. A vehicle management system according to claim 5, wherein the vehicle information is operating information of the vehicle.

9. A vehicle management system according to claim 6, wherein the vehicle information is operating information of the vehicle.

10. A vehicle management system according to claim 7, wherein the vehicle information is operating information of the vehicle.

11. A vehicle management system according to claim 1 or 2, wherein the vehicle operation controller registers the sub operating side mobile communication terminal as a partner in addition to the main operating side mobile communication terminal to allow for enablement of the sub terminal operation signal of the sub operating side mobile communication terminal.

12. A vehicle management system according to claim 3, wherein the vehicle operation controller registers the sub operating side mobile communication terminal as a partner in addition to the main operating side mobile communication terminal to allow for enablement of the sub terminal operation signal of the sub operating side mobile communication terminal.

13. A vehicle management system according to claim 4, wherein the vehicle operation controller registers the sub operating side mobile communication terminal as a partner in addition to the main operating side mobile communication terminal to allow for enablement of the sub terminal operation signal of the sub operating side mobile communication terminal.

14. A vehicle management system according to claim 5, wherein the vehicle operation controller registers the sub operating side mobile communication terminal as a partner in addition to the main operating side mobile communication terminal to allow for enablement of the sub terminal operation signal of the sub operating side mobile communication terminal.

15. A vehicle management system according to claim 6, wherein the vehicle operation controller registers the sub operating side mobile communication terminal as a partner in addition to the main operating side mobile communication terminal to allow for enablement of the sub terminal operation signal of the sub operating side mobile communication terminal.

16. A vehicle management system according to claim 4, wherein the vehicle operation controller registers the sub operating side mobile communication terminal as a partner in addition to the main operating side mobile communication terminal to allow for enablement of the sub terminal operation signal of the sub operating side mobile communication terminal.

* * * * *